(12) United States Patent
Schrijen et al.

(10) Patent No.: US 9,252,960 B2
(45) Date of Patent: Feb. 2, 2016

(54) SYSTEM FOR ESTABLISHING A CRYPTOGRAPHIC KEY DEPENDING ON A PHYSICAL SYSTEM

(75) Inventors: Geert Jan Schrijen, TD Venlo (NL); Pim Theo Tuyls, Turnhout (BE); Helena Handschuh, Palo Alto, CA (US)

(73) Assignee: INTRINSIC ID B.V., Eindhoven (NL)

( * ) Notice: Subject to any disclaimer, the term of this patent is extended or adjusted under 35 U.S.C. 154(b) by 330 days.

(21) Appl. No.: 13/254,356

(22) PCT Filed: Feb. 10, 2010

(86) PCT No.: PCT/EP2010/051631
§ 371 (c)(1),
(2), (4) Date: Nov. 15, 2011

(87) PCT Pub. No.: WO2010/100015
PCT Pub. Date: Sep. 10, 2010

(65) Prior Publication Data
US 2012/0072737 A1 Mar. 22, 2012

(30) Foreign Application Priority Data
Mar. 6, 2009 (EP) .................................. 09154562

(51) Int. Cl.
*H04L 9/32* (2006.01)
*G06F 7/58* (2006.01)
(Continued)

(52) U.S. Cl.
CPC .............. *H04L 9/3278* (2013.01); *G06F 7/588* (2013.01); *H04L 9/0816* (2013.01); *H04L 9/304* (2013.01); *H04L 2209/08* (2013.01)

(58) Field of Classification Search
CPC ............................. H04L 9/3278; G06F 7/588
USPC .......................................................... 713/189
See application file for complete search history.

(56) References Cited

U.S. PATENT DOCUMENTS 6,697,276 B1 * 2/2004 Pereira et al. ............... 365/49.17
8,032,760 B2 * 10/2011 Tuyls ................. G07C 9/00158
713/186

(Continued)

FOREIGN PATENT DOCUMENTS

FR      2871910      12/2005
JP      2002519722   12/2005

(Continued)

OTHER PUBLICATIONS

Novel PUF-Based Error Detection Methods in Finite State Machines; Ghaith Hammouri et al.; ICISC 2008, LNCS 5461, pp. 235-252, 2009.*

(Continued)

*Primary Examiner* — James Turchen
(74) *Attorney, Agent, or Firm* — Nixon & Vanderhye P.C.

(57) ABSTRACT

In systems for establishing a cryptographic key depending on a physical uncloneable function (PUF) it may be a problem that internal information correlated with the cryptographic key is leaked to the outside of the system via a side-channel. To mitigate this problem a cryptographic system for reproducibly establishing a cryptographic key is presented. The system comprises a physical system comprising a physical, at least partially random, configuration of components from which an initial bit-string is derived. An error corrector corrects deviations occurring in the initial bit-string. Through the use of randomization the error corrector operates on a randomized data. Information leaking through a side channel is thereby reduced. After error correction a cryptographic key may be derived from the initial bit-string.

19 Claims, 5 Drawing Sheets

(51) Int. Cl.
*H04L 9/08* (2006.01)
*H04L 9/30* (2006.01)

(56) References Cited

U.S. PATENT DOCUMENTS

| | | | |
|---|---|---|---|
| 8,130,955 B2* | 3/2012 | Trichina | G06F 7/588 331/78 |
| 2005/0229086 A1* | 10/2005 | Weng | H03M 13/152 714/781 |
| 2006/0210082 A1* | 9/2006 | Devadas | G06F 21/31 380/277 |
| 2007/0206785 A1 | 9/2007 | Romain | |
| 2008/0279373 A1* | 11/2008 | Erhart | H04L 9/302 380/46 |
| 2010/0085891 A1* | 4/2010 | Kind et al. | 370/253 |
| 2010/0199104 A1* | 8/2010 | Van Rijnswou | G06F 21/53 713/189 |

FOREIGN PATENT DOCUMENTS

| | | |
|---|---|---|
| WO | WO 9967919 | 12/1999 |
| WO | 2008/075224 A1 | 6/2008 |
| WO | WO 2009002599 | 12/2008 |

OTHER PUBLICATIONS

Randomness in Integrated Circuits with Applications in Device Identification and Random Number Generation; Daniel Holcomb; University of Massechusetts; Feb. 2014.*
English language translation of Japanese Office Action in Japanese application No. 2011-552379, dated Jan. 7, 2014.
Christoph Bosch et al.: "Efficient Helper Data Key Extractor on FPGA's", Aug. 10, 2008, Cryptographic Hardware and Embedded Systems a Ches 2008; [Lecture Notes in Computer Science], Springer Berlin Heidelberg, Berlin, Heidelberg, pp. 184-197, XP019102176, ISBN: 9783540850526, p. 185, last paragraph, pp. 187-190.
Akkar M-L et al: "An Implementation of DES and AES, Secure Against Some Attacks" Cryptographic Hardware and Embedded Systems. $3^{rd}$ International Workshop, Ches 2001, Paris, France May 14-16, 2001 Proceedings; {Lecture Notes in Computer Science], Berlin: Springer, DE, vol. 2162, Jan. 1, 2001, pp. 309-318, XP 008002641, ISBN 978-3-540-42521-2, pp. 309-312.
International Search Report for PCT/EP2010/051631 mailed May 19, 2010.
Written Opinion for PCT/EP2010/051631 mailed May 19, 2010.
English language translation of Office Action issued Nov. 16, 2015 in corresponding Korean application No. 10-2011-7023529.

* cited by examiner

SYSTEM FOR ESTABLISHING A CRYPTOGRAPHIC KEY DEPENDING ON A PHYSICAL SYSTEM

This application is the U.S. national phase of International Application No. PCT/EP2010/051631 filed 10 Feb. 2010 which designated the U.S. and claims priority to EP 09154562.4 filed 6 Mar. 2009, the entire contents of each of which are hereby incorporated by reference.

FIELD OF THE INVENTION

The invention relates to a cryptographic system for reproducibly establishing a cryptographic key comprising a physical system comprising a physical, at least partially random, configuration of components and an initial bit-string producer for establishing an initial bit-string, the initial bit-string depending on the configuration.

The invention further relates to a cryptographic system for reproducibly establishing a code word.

The invention further relates to a corresponding method and computer program.

BACKGROUND OF THE INVENTION

A Physical Uncloneable Function (PUF) is a function which is embodied as a physical system, in such a way that an output of the function for an input is obtained by offering the input to the physical system in the form of a stimulus, and mapping the behavior that occurs as a result of an interaction between the stimulus and the physical system to an output. Wherein the interaction is unpredictable and depends on essentially random elements in the physical system, to such an extent, that it is unfeasible to obtain the output, without having had physical access to the physical system, and that it is unfeasible to reproduce the physical system. Preferably, a PUF is also easy to evaluate. For practical uses, PUFs are preferably low in manufacture costs.

Conventionally, an input or stimulus that a PUF accepts is called a 'challenge'. The output of a PUF, that is, the behavior the PUF exhibits after interaction with the stimulus, is called a 'response'. A pair comprising a challenge and the corresponding response of a PUF is called a challenge-response pair. Some types of PUFs allow a wide range of different inputs, some types allow a more limited range of inputs, or may even allow only a single input. It would be most preferable, if a PUF when evaluated multiple times for the same challenge would produce multiple responses which are all equal. This property is not necessary though, and, in practice, most PUFs do not posses it. As long as the multiple responses lie sufficiently close to each other, the PUF can be usefully applied.

Since the interaction between a stimulus and the physical system cannot be predicted without access to the system, the PUF is hard to characterize and to model. The output of a particular PUF for an input can therefore only be obtained using the particular physical system underlying the particular PUF. Possession of a challenge-response pair is proof that at some point the challenge was offered to the unique physical system that underlies the PUF. Because of this property, i.e., the property that challenge-response pairs are coupled to a unique physical device, a PUF is called uncloneable. By equipping a device with a PUF, the device also becomes uncloneable.

Physical systems that are produced by a production process that is, at least in part, uncontrollable, i.e., a production process which will inevitably introduce some randomness, turn out to be good candidates for PUFs.

One advantage of PUFs is that they inherently possess tamper resistant qualities: disassembling the PUF to observe its working, will also disturb the random elements and therefore also disturb the way inputs are mapped to outputs. Various types of PUFs are known in the art, including optical PUFs and electronical PUFs.

One way of constructing a PUF uses a static random access memory (SRAM); these PUFs are called SRAM PUFs. SRAMs have the property that after they are powered-up, they are filled with a random pattern of on-bits and off-bits. Although the pattern may not repeat itself exactly if the SRAM is powered-up a next time, the differences between two such patterns is typically much smaller than half the number of bits in the state.

A second kind of S-RAM PUFs is constructed with Dual Port RAM. By writing at the same time different information on both ports, the memory cell is brought into an undefined state which shows a PUF-like behavior.

Due to unavoidable variations during production, the configuration of the components of an SRAM relative to each other is at least slightly random. These variations are reflected, e.g., in a slightly different threshold voltage of the memory cells of the SRAM. When the SRAM is read out in an undefined state, e.g., before a write action, the output of the SRAM depends on the random configuration. Producing a new SRAM, with the same characteristic behavior requires producing an SRAM with the same configuration, a configuration which was achieved randomly. As this is unfeasible, the SRAM is uncloneable as a physical system, that is, it is a PUF.

A further example of PUFs are the so-called delay PUFs. The delay caused by a connection between two regions of an integrated circuit, such as an FPGA, is precisely measured and used for the PUF output. The delay may, e.g., be measured by incorporating the connection in a ring oscillator and determining the frequency of the ring oscillator. The connection may be routed depending on an input of the PUF. For example, the connection may be routed through a series of delay elements, wherein each delay element comprises at least two possible paths. The input to the PUF comprises multiple selector bits, the path used in a specific delay element depending on a specific selector bit. Since the components in the delay elements differ at least slightly, the precise delay which is caused by a delay element also differs slightly. Accordingly, the output of the delay PUF depends on the random configuration of the components.

Note that some pre or post processing may be used with a PUF. For example, a delay PUF may be used multiple times to produce multiple output bits, which are concatenated together to produce a bit-string. Also a PUF may use processing data to aid the processing of the PUF. For example, average delay times may be stored with a delay PUF in order to compare the actual delay with an average delay.

One application of PUFs is to derive a cryptographic key on an electronic circuit. The electronic circuit typically includes an integrated Circuit (IC) and/or programmable logic. The programmable logic comprises, e.g., a field-programmable gate array (FPGA), a programmable logic device (PLD), or a digital signal processor (DSP), a microprocessor, etc. Instead of storing the cryptographic key in a non-volatile memory of some kind, the key is generated from the PUF only when the key is needed by the device. The key can be deleted when it is no longer needed. The next time the key is needed, it can be derived again from the PUF. Since the PUF may not give the exact same result when the same challenge is evaluated twice, a so-called Helper Data algorithm, also known as a Fuzzy Extractor, may be used to ensure that the key will be the same, each time it is derived. One way of using helper data to construct reproducible values from noisy measurements is described, e.g., in international patent application WO 2006/129242, "Template Renewal in Helper Data Systems", etc.

One way to use a PUF to create a cryptographic key is as follows. First, during an enrollment phase, a challenge-response pair is created. Then, using the fuzzy extractor, helper data is created. On the device the challenge and the helper data are stored in a non-volatile memory. To derive the cryptographic key, a new response is obtained by evaluating the PUF for the challenge again. By combining the new response with the stored helper data, according to a helper data algorithm, a key is derived. The helper data ensures that the key is the same, each time it is derived.

Without a PUF, the cryptographic key may be recovered by an attacker, by mounting a physical attack on the non-volatile memory where the key is traditionally stored. For example, the attacker may open the memory and probe its content. Using a PUF makes this type of attack much harder, since opening the PUF will typically disturb the precise way in which the PUF interacts with inputs. Accordingly, information the attacker learns from his probe is not related to the interaction which was used to create the cryptographic key. This makes it harder for an attacker to find the key using a physical attack.

Unfortunately, intrusive physical attacks are not the only attack vector along which an attacker may obtain at least some information on the internal state of the PUF. So-called side channels may also leak information. A side-channel is an information source on a system related to physical phenomena occurring inside the system that may be observed from outside the system and that reveals information which, at least to some extend, is correlated with the internal operation and/or state of the system, other than its intended, observable, input-output behavior.

Power consumption, time consumption and electromagnetic radiation are examples of side-channels that are relevant to cryptographic systems. For example, the power consumption of a cryptographic system monitored while the system uses a cryptographic key may to some extend be correlated to the key. As it is of prime importance to keep the cryptographic key confidential, any leakage of information correlated with that key is problematic.

It is a problem of the prior art that a PUF-based cryptographic system reveals information on its internal operation through side-channels.

SUMMARY OF THE INVENTION

It is an object of the invention to avoid or mitigate the leakage of sensitive information through side-channels of PUF based systems.

This and other objects are achieved by a cryptographic system for reproducibly establishing a cryptographic key according to the invention. The cryptographic system for reproducibly establishing a cryptographic key comprises: a physical system comprising a physical, at least partially random, configuration of components, an initial bit-string producer for establishing an initial bit-string, the initial bit-string depending on the configuration, a normalizer for establishing in dependency on the initial-bit string a first correctable bit-string, the first correctable bit-string lying in a correctable neighborhood of an error correcting code, a pre-determined error correcting algorithm for mapping an element of the correctable neighborhood to a code word being associated with the error correcting code, an error-corrector, for establishing a first code word of an error correcting code in dependency on the first correctable bit-string using the error correcting algorithm, a key establisher for establishing the cryptographic key in dependency on the first code word by applying a pre-determined key derivation algorithm. The cryptographic system further comprises a randomizer for producing a randomizing component the establishing of the first correctable bit-string is further dependent on the randomizing component, the establishing of the cryptographic key is further dependent on the randomizing component for making the cryptographic key reproducible by removing the effect of the randomizing component.

An advantage of the cryptographic system according to the invention is that a possible side-channel of the error corrector is obfuscated. Even if information on the first code word were leaked to outside the cryptographic system, this information would be of little value to an attacker since the value is randomized with the randomizing component. As the randomizing component is not known to an attacker, this reduces the information he can obtain from the side channel.

In outline, this effect is achieved as follows. The normalizer transforms the first correctable bit-string, not only in dependency on the initial bit-string, but also in dependency on a randomizing component. Accordingly, the operation of the error corrector, while mapping the first correctable bit-string to a first code word is also randomized. Possible side channels of the error corrector are masked through the randomizing. Information leaked through a side channel is information related to the first correctable bit-string and/or first code word and these are both randomized.

The subsequent establishing of the cryptographic key also depends on the randomizing component, so that the effect of the randomizing component may be removed. In this way the key is still reproducible even though a randomizing component was used during the operation of the error corrector.

The cryptographic system according to the invention may be utilized in applications using a secret key, for example, in application related to banking, mobile telephony and set-top boxes, etc. In particular the system according to the invention may be comprised in a smart card for access control. Both physical access control, e.g., to buildings, or digital access control, e.g., as in DRM systems, can be done using the invention. The invention can also be applied in desktop computers to establish a cryptographic key used as a unique identifier.

The initial bit-string and by implication the cryptographic key may not be fully random. For example, the distribution of the initial bit strings over the possible physical systems may not be uniform. It is therefore of advantage to at least mask this by applying a key derivation. Preferably, the cryptographic key comprises fewer bits than the initial bit string. Preferably, the cryptographic key comprises fewer bits than the number of data bits in the first code word, i.e., the number of bits in the first code word minus the number of redundancy bits.

In a preferred embodiment, the cryptographic system comprises a code word adder and a code word subtractor, wherein the randomizing component comprises a random code word of the error correcting code and the normalizer is coupled to the code word adder for adding at least the random code word to at least the initial bit-string, and the key establisher is coupled to the code word subtractor for subtracting the random code word from the first code word.

An efficient way to mask a bit-string, including a code word, is by adding another bit-string to it. The adder may be an xor-adder using the xor-addition, in which case the subtractor may be equal to the adder. Preferably, the error correcting code is a linear code. From information theory it is known that adding a random bit to a known bit perfectly masks the known bit. Although the random code word is restrained in that it must be a code word, it will nevertheless mask the initial bit-string to a large extent.

In a preferred embodiment, the cryptographic system comprises a helper data store for storing a helper data bit-string, the helper data bit-string being a difference between an enrollment bit-string established by the initial bit-string producer and a second code word of the error correcting code, the code word adder being configured for adding at least the helper data bit-string, the initial bit-string and the random code word to establish the first correctable bit-string.

If the helper data comprises a bit-string which must be added to the initial bit-string, which is one way of mapping the initial bit-string to a correctable bit-string, then this addition may efficiently be combined with the addition of the random code word. For example, the adder may be re-useable hardware and/or software.

Preferably, the establishing of the cryptographic key is dependent on the second code word. It is noted that the cryptographic key may depend on the first code word solely through its dependency on the second code word.

The key may depend on the first code word through various intermediate determining steps. For example, in a preferred embodiment, the enrollment bit string is established from the second code word and the helper data. The key may then be derived from the enrollment bit-string. For example, if the helper data is obtained as the XOR between the second code word and the enrollment bit-string, then the enrollment bit-string can be reconstructed from the second code word by determining the XOR addition of the helper data and the second code word.

In a preferred embodiment the code word adder is configured for first adding the helper data bit-string and the random code word to obtain an intermediate bit-string and for adding the initial bit-string to the intermediate bit-string. In a preferred embodiment the code word adder is configured for first adding the random code word and the initial bit-string to obtain the intermediate bit-string and for adding the helper data bit-string to the intermediate bit-string.

In some applications it is preferred to keep both the initial bit-string and the helper data secret. By making the random code word an element of the first addition, the operation of the cryptographic system is masked from the start.

In a preferred embodiment, the randomizing component comprises a random permutation from a permutation class, the error correcting code being invariant under the permutation class, the normalizer is configured for establishing in dependency on the initial-bit string an intermediate correctable bit-string lying in the correctable neighborhood, the normalizer being configured for permuting according to the random permutation the intermediate correctable bit-string to establish the first correctable bit-string, the transformer being configured for permuting the first code word according to an inverse of the random permutation.

Permuting a bit-string is another way of obfuscating the bit-string through randomization. Permutations can be of advantage when non-linear codes are used. For example, the error correcting code may be chosen to be a non-linear cyclic code, e.g., over $Z_4$, i.e., over an additive ring with four elements. In a preferred embodiment, the permutation class consists of cyclic permutations and the error correcting code is a cyclic code.

In a preferred embodiment, an execution time of the error corrector for establishing the first code word in dependency on the first correctable bit-string is substantially independent from the first correctable bit-string.

The amount of execution time used by the error corrector may also form a side channel. For example, for some codes the execution time is related to the number of errors in the input or to the hamming weight of the codeword, etc. In this way information on the inner workings of the cryptographic system may leak to the outside of the system. The execution time can be made independent by using an error correcting algorithm with a constant decoding time. The cryptographic system may also comprise an execution time randomizer, for introducing dummy operation, which obfuscates the real execution time. The cryptographic system may alternatively comprise means for performing dummy operations for filling up un-used time of an execution time maximum.

Reducing the correlation between the execution time and the first correctable bit-string is achieved in a preferred embodiment, wherein the error corrector is arranged for partitioning the first correctable bit-string into a plurality of sub-strings, a specific sub-string of the plurality of sub-strings lying in a further correctable neighborhood of a further error correcting code, and selecting a specific further code word within a substantially pre-determined time from an enumeration of all further code words in the further error correcting code, the specific further code word being closest to the specific sub-string, according to a predetermined distance function. Establishing the first code word is further dependent on the specific further code word.

Enumerating all further code words takes a constant amount of time. Also the selection from the enumeration takes a constant amount of time. Hence, the execution time needed by the error corrector for mapping the specific sub-string onto the specific code word is independent from the specific sub-string. Accordingly, at least a part of the information that may be leaked through the execution time side channel, that is the part related to the specific sub-string, is masked and the correlation between the execution time and the first correctable bit-string is correspondingly reduced.

In a preferred embodiment, each code word in the further error correcting code comprises a data part and a redundancy part. The error correcting code has an ordering according to which a collection of the data parts of the code words in the further error correcting code forms a sequential list of integers. The system comprises a storage for storing the redundancy parts of the code words according to the ordering.

Many error correcting codes have the property that their code words can be divided into data bits and redundancy bits, e.g., parity bits. Typically, the data bits are used to encode data, while the redundancy bits are assigned values which depend on the data bits. For example, linear codes have this property. One way of ensuring a constant decoding time of the error correcting code is to store a table comprising the error correcting code in storage. However, there is no need to store the data bits along with the redundancy bits. If the error correcting codes are ordered such that the data bits form a list of sequential integers, the address can be used to index the correct code word. The data part can be formed by taking the address of the redundancy part and subtracting the address of the first redundancy part. This operation can significantly reduce the amount of storage needed.

Note that this way of storing an error correcting code also allows constant time encoding of data bits. To produce a code word, e.g., a random code word, a data part is produced, e.g. a random data part, which is combined with the appropriately looked-up redundancy part. Combining may be done by concatenation.

In a preferred embodiment the key derivation algorithm further depends on an index, the cryptographic system comprising an index establisher for establishing the index. In some devices which use the cryptographic system to authenticate to another system, it is beneficial to renew the key frequently. By introducing an index in the key derivation this is accomplished. The index may be communicated to the other system. The other system can then construct the used key, e.g., form a copy of the enrollment bit-string, from a copy of the second code word, or from a copy of a de-randomized first code word, etc. The index may also be used to select a hash function from a family of hash functions. The selected hash function can be used as the key derivation function.

In a preferred embodiment, the key derivation algorithm comprises selecting a hash function from a family of hash functions in dependence upon the index. The key establisher is configured for applying said selected hash function to the first code word. Removing the effect of the randomizing component is dependent on the selected hash function applied to the randomizing component.

It was an insight of the inventor to combine the key derivation with a family of hash functions. Since the choice of hash function is randomized through the index, the individual cryptographic requirements of a hash function in the family can be lessened, at least for less sensitive applications. In particular, this allows a sufficient cryptographic strength while postponing the removal of the randomizing component until after a hash function has been applied in the key derivation.

A cryptographic system for reproducibly establishing a reproducible code word can also be constructed using the principle of the invention. For some applications it may not be necessary to establish a cryptographic key. Only a unique bit-string may be sufficient, such as the reproducible code word. Note that the reproducible code word can be first decoded, to remove the redundancy.

The cryptographic method for reproducibly establishing a cryptographic key comprises establishing an initial bit-string, the initial bit-string depending on a physical, at least partially random, configuration of components comprised in a physical system, establishing in dependency on the initial-bit string a first correctable bit-string, the first correctable bit-string lying in a correctable neighborhood of an error correcting code, a pre-determined error correcting algorithm for mapping an element of the correctable neighborhood to a code word being associated with the error correcting code, establishing a first code word of an error correcting code in dependence on the first correctable bit-string using the error correcting algorithm, establishing the cryptographic key in dependency on the first code word by applying a pre-determined key derivation algorithm. The method further comprises producing a randomizing component, the establishing of the first correctable bit-string is further dependent on the randomizing component, and the establishing of the cryptographic key is further dependent on the randomizing component for making the cryptographic key reproducible by removing the effect of the randomizing component.

A preferred embodiment of the cryptographic method, comprises partitioning the first correctable bit-string into a plurality of sub-strings, a specific sub-string of the plurality of sub-strings lying in a further correctable neighborhood of a further error correcting code and selecting a specific further code word within a substantially pre-determined time from an enumeration of all further code words in the further error correcting code, specific further code word being closest to the specific sub-string, according to a predetermined distance function, wherein establishing the first code word is further dependent on the specific further code word.

A preferred embodiment of the cryptographic method, comprises establishing an index, and wherein establishing the cryptographic key further depends on the index.

A method according to the invention may also be implemented on a computer as a computer implemented method. Executable code for a method according to the invention may be stored on a computer program product.

The computer program comprises computer program code means adapted to perform all the steps of a method according to the invention when the computer program is run on a computer. Preferably, the computer program is embodied on a computer readable medium.

In systems for establishing a cryptographic key depending on a physical uncloneable function (PUF) it may be a problem that internal information correlated with an internal cryptographic key is leaked to the outside of the system via a side-channel. This problem is mitigated by the cryptographic system for reproducibly establishing a cryptographic key according to the invention. The system comprises a physical system comprising a physical, at least partially random, configuration of components from which an initial bit-string is derived. An error corrector corrects deviations occurring in the initial bit-string. Through the use of randomization the error corrector operates on a randomized data. Information leaking through a side channel is thereby reduced. After error correction a cryptographic key may be derived from the initial bit-string.

BRIEF DESCRIPTION OF THE DRAWINGS

The invention is explained in further detail by way of example and with reference to the accompanying drawings, wherein.

Throughout the figures, similar or corresponding features are indicated by same reference numerals.

Figure 1:
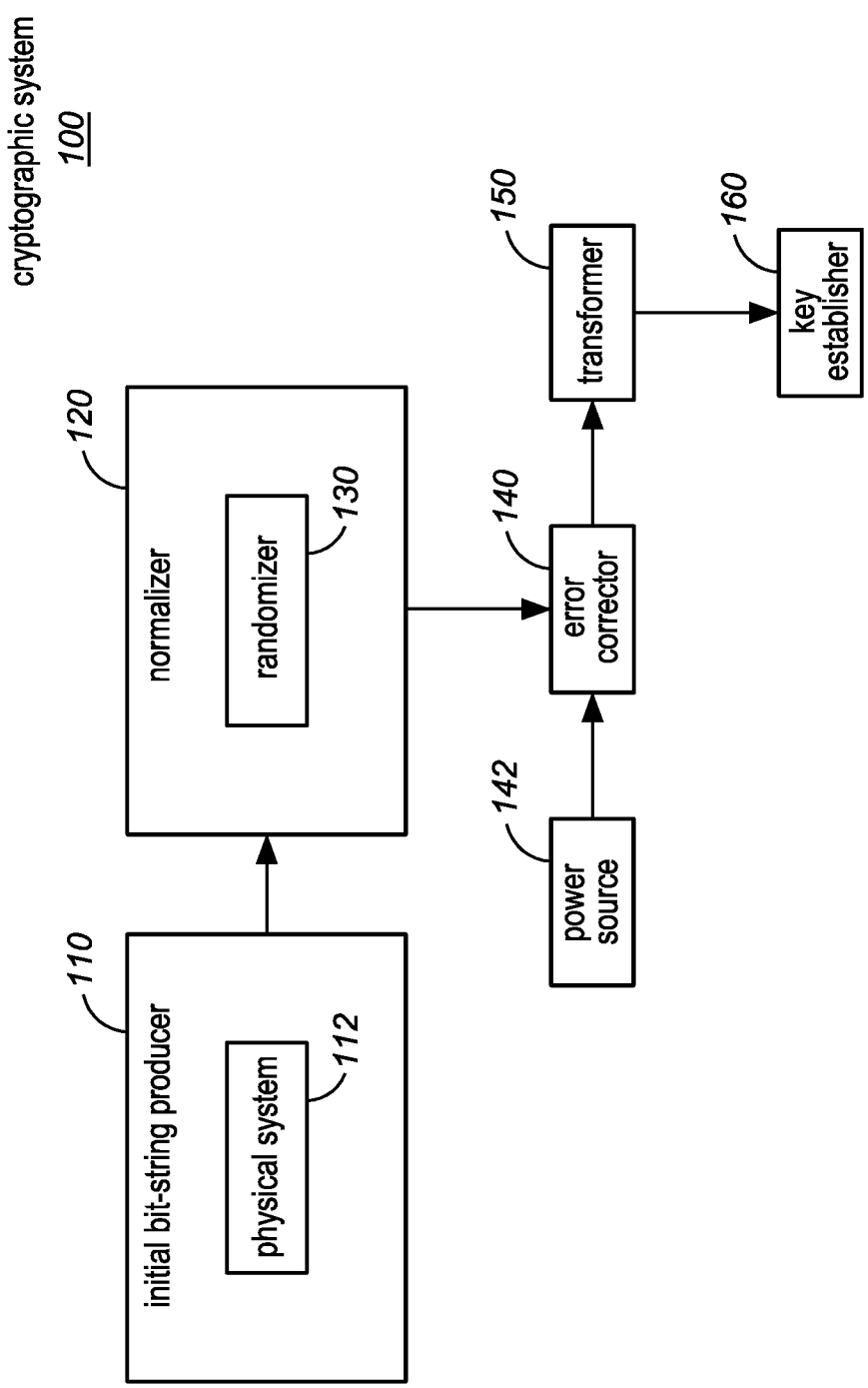
FIG. 1 is a block diagram, schematically illustrating an architecture of an embodiment of the cryptographic system.

LIST OF REFERENCE NUMERALS 100 a cryptographic system
110 an initial bit-string producer
112 a physical system
120 a normalizer
130 a randomizer
140 an error corrector
142 a power source
150 a transformer
160 a key establisher
204 a helper data store
206 an adder
212 a random number generator
214 an encoder
300 a vector space
302a a helper data addition to the initial bit-string
302b a helper data addition to the secondary bit-string 304a a random code word addition to the second correctable bit-string
304b a random code word addition to the initial bit-string
306 a random code word subtraction of the first code word
310 an initial bit-string
320 a secondary bit-string
330 a first correctable bit-string
332 a first code word
340 a second correctable bit-string
342 a second code word
350 an initial region
360 a first correctable neighborhood
370 a second correctable neighborhood
410 a bit-string receiver
422 a first corrector
424 a second corrector
430 a bit-string concatenator
510,520 a codeword
521 a small codeword

DETAILED EMBODIMENTS

In the remainder, a description is given of three main inventions relating to PUFs. The inventions can be used together but may also be used independent of each other or in combination with other techniques.

In summary, the main inventions are:

1. Randomization of the Error Corrector Input.

Using randomization before error correction makes the output of a PUF reproducible, while reducing the information emanating from the error corrector through a side-channel.

2. Error Corrector with Independent Execution Time

Arranging the error corrector such that the execution time for its operation is independent from its input reduces the information leaked through a time-consumption side-channel.

A possible embodiment is as follows: A cryptographic system for reproducibly establishing a cryptographic key comprising a physical system comprising a physical, at least partially random, configuration of components, an initial bit-string producer for establishing an initial bit-string, the initial bit-string depending on the configuration, a normalizer for establishing in dependency on the initial-bit string a first correctable bit-string, the first correctable bit-string lying in a correctable neighborhood of an error correcting code, a pre-determined error correcting algorithm for mapping an element of the correctable neighborhood to a code word being associated with the error correcting code, an error-corrector, for establishing a first code word of an error correcting code in dependency on the first correctable bit-string using the error correcting algorithm, a key establisher for establishing the cryptographic key in dependency on the first code word by applying a pre-determined key derivation algorithm, wherein the error corrector is arranged for partitioning the first correctable bit-string into a plurality of sub-strings, a specific sub-string of the plurality of sub-strings lying in a further correctable neighborhood of a further error correcting code, and selecting a specific further code word within a substantially pre-determined time from an enumeration of all further code words in the further error correcting code, the specific further code word being closest to the specific sub-string, according to a predetermined distance function, wherein establishing the first code word is further dependent on the specific further code word.

3. Index Use in Key Establishment

By making the key derivation dependent on an index, key renewal is achieved. The key used for communication may be different each time a different index is used.

Moreover, a possible side-channel of the key derivation function, e.g., a hash function, is masked through the use of the index.

A possible embodiment is as follows: A cryptographic system for reproducibly establishing a cryptographic key comprising a physical system comprising a physical, at least partially random, configuration of components, an initial bit-string producer for establishing an initial bit-string (310), the initial bit-string (310) depending on the configuration, a normalizer for establishing in dependency on the initial-bit string a first correctable bit-string, the first correctable bit-string lying in a correctable neighborhood of an error correcting code, a pre-determined error correcting algorithm for mapping an element of the correctable neighborhood to a code word being associated with the error correcting code, an error-corrector, for establishing a first code word of an error correcting code in dependency on the first correctable bit-string using the error correcting algorithm, a key establisher for establishing the cryptographic key in dependency on the first code word by applying a pre-determined key derivation algorithm, wherein the key derivation algorithm further depends on an index, the cryptographic system comprising an index establisher for establishing the index.

While these inventions are susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 is a block diagram, schematically illustrating an architecture of a first embodiment of a cryptographic system 100. It is noted that various alternatives exist for this embodiment and its various components, some of which are described together with the other figures.

Cryptographic system 100 comprises an initial bit-string producer 110, a normalizer 120, an error corrector 140 and a key establisher 160. Cryptographic system 100 further comprises a transformer 150 for use with the key establisher 160.

The initial bit-string producer 110 is coupled to, e.g., comprises, a physical system 112. Physical system 112 comprises a physical, at least partially random, configuration of components. Initial bit-string producer 110 is configured to establish an initial bit-string which depends on the configuration. Various examples of such physical systems exist. For example, physical system 112 may be an S-RAM memory, which is read out by initial bit-string producer 110 after powering the SRAM but before data is written to the S-RAM memory. An S-RAM memory is constructed from various components, the precise configuration of those components relative to each other always being slightly random, due to production process variations. These random variations determine, at least partially, the outcome of an undefined read operation, i.e., a read-operation without a preceding write operation.

Figure 3:
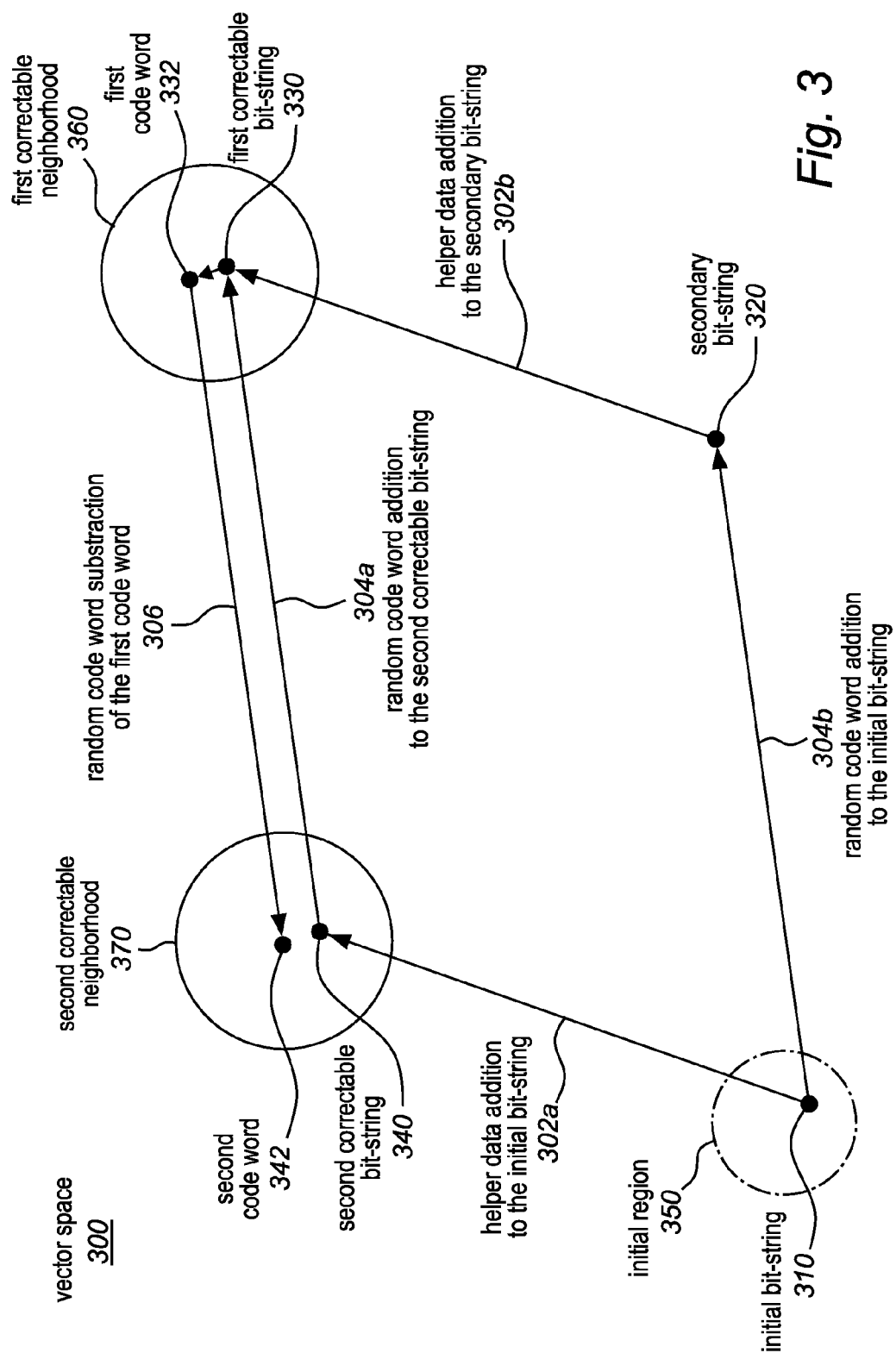
FIG. 3 is a diagram, schematically illustrating an error correcting code.
Figure 5A:
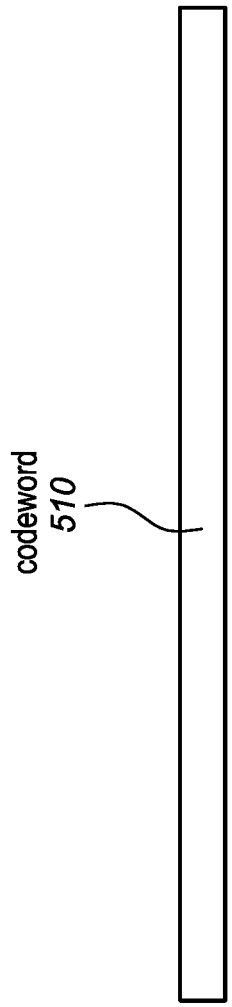
FIG. 5a and FIG. 5b are block diagrams, each schematically illustrating a code word.

Initial bit-string producer 110 is communicatively coupled to normalizer 120 for normalization of the initial bit-string. The initial bit-string is typically not exactly reproducible. If initial bit-string producer 110 were to read physical system 112 out multiple times, then it would obtain multiple probably different initial bit-strings. Normalizer 120 is configured for establishing, in dependency on the initial-bit string a first correctable bit string 330. We refer to FIG. 3, in which a possible configuration of the various variables, including first correctable bit string 330, is schematically illustrated. FIG. 3 will be discussed more fully below. The first correctable bit-string 330 lies in a correctable neighborhood of an error correcting code, that is, in a correctable neighborhood of some error correcting code word in the error correcting code. For example, in an embodiment wherein the initial bit-string producer produces a bit string of, at most, 127 bits, a BCH code (127, 15, 55) error correcting code may be used. Note that BCH codes are cyclic codes. A code word from this code is 127 bits long, but code words may be padded if desired. For example, adding one padding bit, e.g., a zero bit, a 127 bit code word may be conveniently stored in 16 bytes. FIG. 5*a* schematically depicts a 127 bit code word 510.

For its operation normalizer 120 depends on a randomizer 130 for providing it with a randomizing component. In FIG. 1, the randomizer 130 is comprised in normalizer 120. However, randomizer 130 may also be communicatively coupled to normalizer 120. The randomizer 130 is used to randomize the correctable bit-string which is obtained from the initial bit-string. If the initial bit-string producer 110 is used multiple times, then the multiple initial bit-strings will be, preferably, close together. However, through the application of the randomizing component, the multiple correctable bit-strings that normalizer 120 establishes for the multiple initial bit-strings are, preferably, not close together. Various possible embodiments are possible for normalizer 120, as will be described elsewhere.

Normalizer 120 is communicatively coupled to error corrector 140 for mapping first correctable bit-string 330 to a first code word 332, using a pre-determined error correcting algorithm which maps an element of the correctable neighborhood to a code word. For example, the error corrector might produce code word 510. Error corrector 140 may use any suitable error correcting algorithm. For example, if the error correcting code is a BCH code, the error corrector can, e.g., use the Berlekamp-Massey algorithm for mapping a correctable bit-string to a code word.

Error corrector 140 uses a power source 142 for its operations. For example, the error corrector 140 may be implemented as an integrated circuit powered by power source 142. Error corrector 140 may also be implemented in software running on a microprocessor, which is powered by power source 142. In any case, it may be that the operation of the error corrector 140 is somewhat observable by observing the power source 142. Note that the coupling between error corrector 140 and power source 142 may lie outside a secure perimeter and may be accessible to an attacker. For example, depending on the type of electronics used, the processing of a word with a high hamming weight may consume more power than the processing of a word with a low hamming weight, and this difference may be observable through observation of power source 142. The internal workings of error corrector 140 may also leak to the outside of cryptographic system 100 via other side-channels. For example, the electromagnetic radiation of the device may change under the influence of the operation of error corrector 140.

Information leaked through a side-channel during error correcting may be related to first code word 332 and/or first correctable bit-string 330. However, the normalization depends on a randomizing component which randomizes the first correctable bit-string 330. Accordingly, information leaked through a side-channel during error correcting is also randomized, which mitigates the side-channel problem.

Although other components of cryptographic system 100 may leak information on their internal state of operation through side-channels, is noted that larger component, such as error corrector 140, are more likely to do so. Larger components typically use more power and/or have a longer execution time.

That the first correctable bit-string 330 depends on a randomizing component is connected to a further advantage. Because of the randomizing component the first correctable bit-string 330 can be substantially different upon substantially each, or most, or some, uses of cryptographic system 100. It is observed that extracting useable information from a side channel requires statistical analysis of multiple actual measurements, such as power measurements. Typically, many measurements are selected according to some criteria and then averaged. By introducing a random element into the measurements, the multiple measurements become less related to each other, complicating the analysis. The way in which the measurements become less related, is unknown to the attacker as the randomizing component is typically unknown to him.

Note that other components of cryptographic system 100, both those shown in the figure and those which are not shown, may use the power source 142.

The error corrector 140 is communicatively coupled to key establisher 160, in this embodiment through a transformer 150. Transformer 150 transforms first code word 332 into a second code word 342, by removing the effect of the randomizing component. Second code word 342 is preferably different from first code word 332. Preferably, first code word 332 and second code word 342 are only slightly related to each other. More preferably, first code word 332 and second code word 342 are unrelated, other than both being a code word. That is, even if one had full knowledge of the first code word than one has no additional knowledge on the second code word.

The transformer 150 is communicatively coupled to key establisher 160. Key establisher 160 establishes the cryptographic key by applying a pre-determined key derivation algorithm to the first code word. The cryptographic key is reproducible since deviations in initial bit-string 310 were removed by the error corrector and deviations caused by the randomizing component were removed by transformer 150.

Key establisher 160 may, for example, apply the error correcting code's decoding function, to remove the redundancy in second code word 342. Alternatively, or in addition, key establisher 160 could apply a hash function. Also key establisher 160 may use second code word 342, or a decoded version, as the input for a key derivation function (KDF), such as described in the internet standard RFC 2898.

For sensitive applications, it is a problem if an attacker learns anything about the cryptographic key, since the risk exist that any information gleaned from a side channel may be exploited, if only to reduce the time need to search for the key. It is therefore an advantage if the error corrector operates on randomized information.

The various components of cryptographic system 100 may be made from dedicated integrated circuits. They can also be made from general purpose circuits, e.g., a microprocessor executing software. Also hybrids are possible, e.g., a microprocessor using some dedicated circuitry. The physical system 112 however comprises at least some physical components.

We will further describe embodiments of randomization using FIG. 3.

FIG. 3 gives a schematic representation of a vector space. Preferably, the elements of the vector space are bit-strings. The points in FIG. 3 are representative of elements of the vector space. For example, the vector space is the set of all bit-strings of a certain length. With the vector space an addition function and a distance function are associated. Preferably, two binary bit-strings are added using the exclusive-or addition (XOR). That is, two bit-strings are added by xor-ing corresponding bits, i.e., the first bit of the first bit-string is xor-ed with the first bit of the second bit-string and so on, until the last bit of the first bit-string is xor-ed with the last bit of the second bit-string. Associated with addition there may be a subtraction. A subtraction has the property that adding a specific bit string to particular bit-string and next subtracting the specific bit-string results in the particular bit-string. Note that the xor-addition has the property that adding the same bit string twice to a particular bit-string results in the particular bit-string. That is, when using XOR the addition function is equal to the subtraction function.

Preferably, for the distance function the so-called hamming distance is used. Two bit-strings have a hamming distance which is equal to the number of bits at corresponding places with different values. One way to compute the hamming distance of two bit-strings, is to add the bit-strings together using the XOR-function and then count the number of '1' bits in the result, that is, determining its hamming weight.

It is noted that many types of vector spaces, with various additions and distance functions exist. In particular, it is pointed out that ternary-bit strings and quaternary-bit strings, may be used with ternary error correcting codes and quaternary error correcting codes, respectively. Both ternary and quaternary bit-string may optionally be expressed as binary bit-strings. For ease of exposition, binary bit-strings and a corresponding binary error correcting code are used in the examples.

A subset of the bit-strings in the vector space forms the code words of an error correcting code. The smallest distance of any two different elements of the error correcting code is called the minimum distance, often denoted as 'd'. Also associated with the error correcting code is the maximum correctable distance, which is equal to d/2, rounded down. The correctable distance is often denoted as T. If a particular codeword is changed into a different bit-string using at most t alterations to its bits then the particular codeword can be uniquely reconstructed from the different bit-string. The collection of bit-string at a distance at most t from the particular codeword is called the correctable neighborhood of that particular code word. The union of all the correctable neighborhoods of all the code words in the error correcting code is called the correctable neighborhood of the error correcting code. Often the parameters of an error correcting code are summarized as a triple (n,k,d). Wherein d denotes the minimum distance, n denotes the number of bits in a bit-string, in particular the number of bits in a correctable bit-string, and k is the dimension of the code word space. In particular, if the code is binary, then the number of code words equals $2^d$.

Associated with the error correcting code there is an error correcting algorithm for mapping an element of the correctable neighborhood to a code word being associated with the error correcting code. The error correcting algorithm takes as input an element of a correctable neighborhood of a particular code word and produces the particular code word as output. Preferably, there is also an encoder associated with the error correcting code. The encoder takes a number as input in a range up to the number of code words and produces a code word as output. For example, a random code word can be produced by encoding a random number. Preferably, also a decoder is associated with the error correcting code. The decoder takes a code word as input and produces a number as output. Preferably, the decoder works as the inverse of the encoder. The encoder adds redundancy to a number while the decoder removes the redundancy. The number may also be represented as a bit string of k bits, of a shorter length than the bit-strings in the error correcting code.

FIG. 3 shows two code words: a first code word 332 and a second code word 342. A first correctable bit-string 330 is comprised in a first correctable neighborhood 360 around first code word 332 and is mapped to first code word 332 by the error correcting algorithm. A second correctable bit-string 340 comprised in a second correctable neighborhood 370 around second code word 342 and is mapped to second code word 342 by the error correcting algorithm. Note, that there may be bit-strings that are not in the correctable neighborhood of the error correcting code.

Preferably, the error correcting code is linear, that is the addition of any two code words is also a code word. Using a linear code has the advantage that it is easier to randomize. The linear code has the property that error correction of the sum of a first correctable bit-string 330 and a random code word equals the sum of the random code word and the error correction of first correctable bit-string.

The random code word acts as a randomizing component. Note that a code word may also be selected in different ways and still be a randomizing component. For example, a pre-determined list comprising a number of random but fixed code words may be used. For each next determination of the cryptographic key, a next code word from the list is used as randomizing component. The next code word may be selected sequentially, or randomly, etc. The randomizing component may be obtained from a true random source, a pseudo random source, a random choice from a list, a changing choice from a list, etc.

During operation cryptographic system 100 may work as follows. Initial bit-string producer 110 for establishing an initial bit-string 310 typically produces bit-strings which are not always equal but which may vary somewhat. Initial bit-string producer 110 produces bit-strings that lie in an initial region 350 of the vector space. Although the bit-strings produced by the initial bit-string producer 110 are not always equal, any two of them typically have a small distance between them. Note that there may be exceptions, that is, the initial bit-string producer 110 may occasionally produce outliers which do not lie in initial region 350. This need not be a problem when this is sufficiently rare for the application.

The initial bit-string can be mapped to a code word through the application of helper data. Helper data can be obtained during an enrolment phase. Preferably, the initial bit-string producer establishes an enrollment bit-string (not shown) and helper data is established for mapping the enrollment bit-string to a code word, say, second code word 342. The helper data is such that when it is applied to a bit-string sufficiently close to the enrollment bit-string, then a bit-string is obtained which lies in correctable neighborhood 370. In particular, if the helper data is applied to initial bit-string 310 then second correctable bit-string 340 is obtained.

In the art various methods are known to create helper data. We will discuss two such methods. In a first method of creating helper data, the helper data may comprise a selection data structure which indicates which sub-set of the bits in the initial bit-string are to be used, and in what order. A bit in the initial bit-string which has a different value as the corresponding bit in the enrollment bit-string results in at most one bit difference with second code word 342, after the helper data is applied to initial bit-string 310.

In a second method of creating helper data, the helper data comprises a bit-string which is a difference between the enrolment bit-string and second code word 342. For example, when using XOR addition, the helper data may comprise the xor-addition of the enrollment bit-string and the second codeword.

Various combinations between these two methods are possible. For example, helper data could both indicate which bits are to be used and in what order, and indicate if some of the bits are to be inverted before use. The helper data may be stored in a helper data store.

In operational use after the enrollment phase, initial bit-string producer 110 produces an initial bit-string 310. To the initial bit-string 310 the helper data is applied by normalizer 120 and a randomizing component which results in a first correctable bit-string 330. The error corrector 140 maps the first correctable bit-string 330 to first code word 332. A key is established from first code word 332, during which the randomizing component is removed. To go from initial bit-string 310 to first correctable bit-string 330 or from first code word 332 to the key can be done in various ways.

For example, to go from initial bit-string 310 to first correctable bit-string 330, normalizer 120 may first apply the helper data to initial bit-string 310, indicated in the figure with 302a, this gives second correctable bit-string 340. Then a randomization can be applied to second correctable bit-string 340 to obtain first correctable bit-string 330. This step is indicated with 304a. Alternatively, normalizer 120 may first apply randomization to initial bit string 310 to obtain a secondary bit-string 320. This step is indicated as 304b. Next one can apply the helper data to obtain first correctable bit-string 330. This step is indicated as 302b.

If the initial bit-string 310 is close enough to the enrollment bit-string then first correctable bit-string 330 lies within first correctable neighborhood 360, that is, within a correctable distance to first code word 332. In that case the error correcting algorithm can map first correctable bit-string 330 to first code word 332.

To go from first code word 332 to the cryptographic key, transformer 150 may first remove the randomizing component, to obtain the second code word 342. This step is indicated with 306. Next, derive a key from the second code word 342, e.g., by applying a hash function, or by decoding second code word 342.

Alternatively, first code word 332 may first be decoded to obtain a first decoded bit string and then remove the randomization. For example, the first code word may first be decoded, i.e., the redundancy in the first code word may be discarded, e.g., by removing parity bits into a first decoded bit string (not shown). The first decoded bit string still depends on the randomizing component. Next, the effect of the randomizing component is removed from the first decoded bit string to obtain a second decoded bit-string (not shown). For example, if the randomizing component is a random code word, then it could be decoded into a random decoded bit-string. The random decoded bit-string may then be subtracted from the first decoded bit-string, to obtain the second decoded bit-string. The second decoded bit-string does not depend on the randomizing component anymore. The second decoded bit-string may be used as a cryptographic key, or a further key derivation algorithm may be applied to the second decoded bit-string. That is, after the error corrector produced the first code word, first a step to reduce redundancy may be done, followed by a de-randomization step, possibly followed by a further redundancy reducing step.

Since the error corrector maps the first correctable bit string 330 to the first code word 332, deviations in the initial bit-string from the enrollment bit-string are removed. After the effects of the randomizing component are also removed, the cryptographic key can be reproduced by cryptographic system 100.

Before applying the key derivation, key establisher 160 may add a fixed secret bit-string to further obfuscate the operation of cryptographic system 100. This binds the cryptographic key both to a bit-string stored in a PUF and to the secret bit-string. The secret bit-string may be stored in a memory, preferably a secure storage, such as secure poly fuses.

Figure 2:
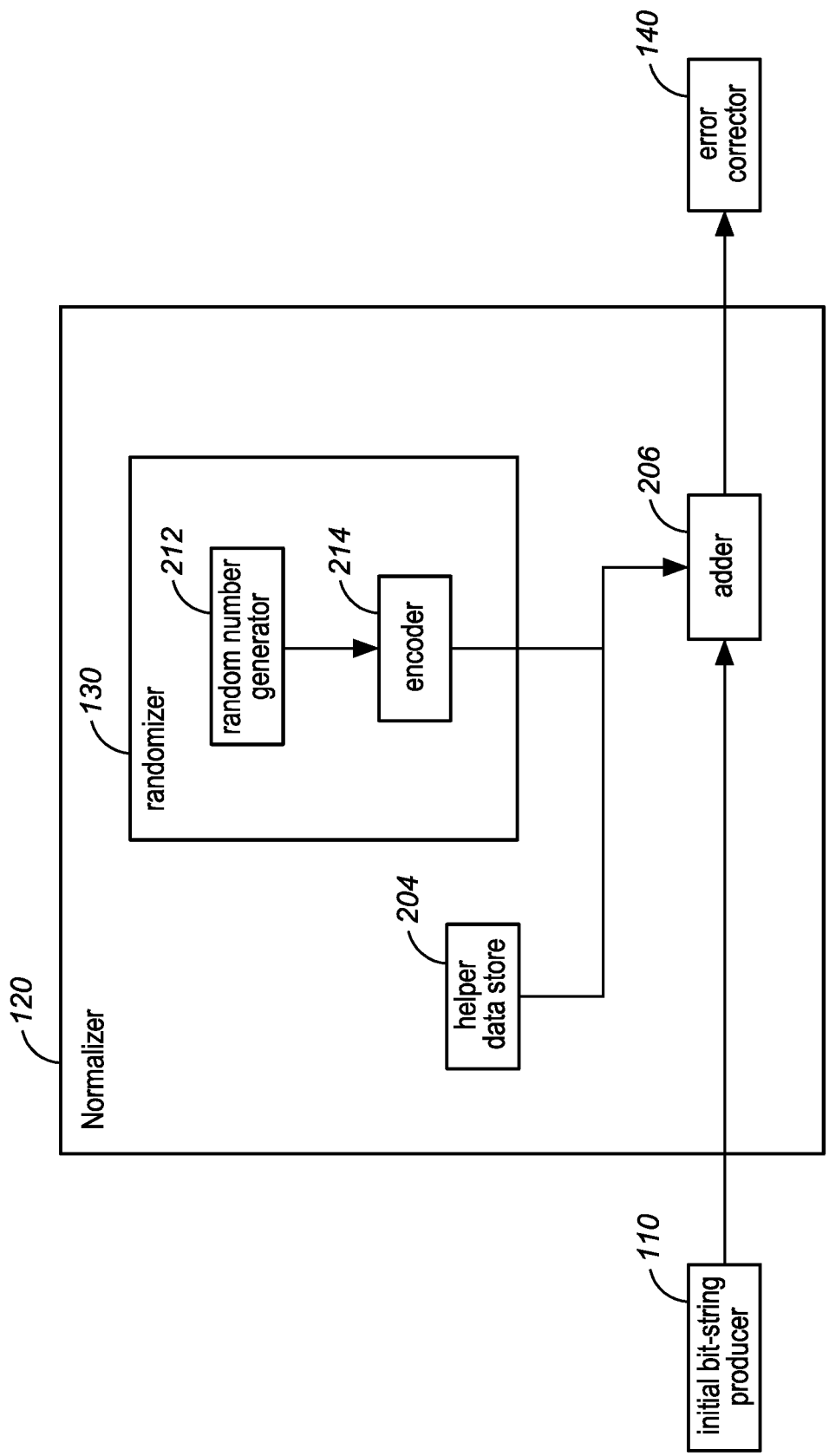
FIG. 2 is block diagram, schematically illustrating an architecture of an embodiment of a normalizer.

In FIG. 2 a schematic architecture for a particular embodiment of normalizer 120 is given. Initial bit-string producer 110 is configured to produce a binary initial bit-string 310 of a certain length.

In normalizer 120 a helper data store 204 is comprised for storing a helper data bit-string. The helper data bit-string may previously be obtained as a difference between an enrollment bit-string established by initial bit-string producer 110 and second code word 342. For example, the helper data bit-string is established using a helper data bit-string establisher. The helper data bit-string establisher may be comprised in cryptographic system 100, it may also be temporarily coupled to cryptographic system 100 during enrollment. After the enrollment phase helper data store 204 stores at least a representation of the helper data, for example, the helper data could be stored in encrypted form, wherein the helper data store 204 is coupled to a decryptor. Normalizer 120 also comprises an adder 206 for adding bit-strings, e.g., using XOR addition. Randomizer 130 comprises a random number generator 212 and an encoder 214. Randomizer 130 is configured to produce a random code word by encoding a random number.

In operation, adder 206 adds the helper data bit-string, the initial bit-string 310 and the random code word together. Note that his may be done in any order. For example, by adding (302a) the helper data to initial bit-string 310, a second correctable bit-string 340 is obtained. By adding (304a) the random code word to second correctable bit-string 340 the first correctable bit-string 330 is obtained. Alternatively, by adding (304b) the random code word to initial bit-string 310 a secondary bit-string 320 is obtained, which in principle may be any random bit-string of vector space 300. By adding (302b) the random bit-string to secondary bit-string 320, first correctable bit-string 330 is obtained. Finally, by subtracting (or adding in case xor addition is used) the random code word from first code word 332 the second code word 342 is obtained. Alternatively, the helper data and the random code word could also be added together first and then add initial bit-string 310 to it.

The output of adder 206 is forwarded to error corrector 140 for error decoding.

For further masking, normalizer 120 may introduce additional errors. For example, the randomizing component may comprise an error bit-string with a hamming weight below a pre-determined boundary. The error bit-string may also be added by adder 206 to the initial bit-string. The boundary is preferably chosen such that the expected number of deviations in the initial-bit string from the enrollment bit-string plus the pre-determined boundary is below the correctable distance of the error correcting code. The expected number of deviations can be established by obtaining for multiple initial bit-strings the number of deviations and establishing a distribution of the numbers.

Preferably, the hamming weight in the error bit-string is random, e.g., randomly chosen from an interval, e.g., the interval from 0 to the boundary. Note that for this type of randomization the transformer need not compensate. Introducing a random number of errors may help preventing or obstructing fault attacks, wherein a device comprising the cryptographic system is manipulated in such a way that a controlled number of errors are introduced, such that output of the device may reveal information on its inner operation. By introducing additional errors the relation between errors introduced by the attacker and the operation of the device becomes obscured as some number of additional errors, unknown to the attacker, is introduced.

One way of organizing normalizer 120 is to first apply a first randomizing transformation on the initial bit-string, e.g., using a first randomizer, comprising, e.g., introducing errors, adding a masking bit-string, etc, second apply a second transformation on the resulting bit-string depending on the helper data to map the resulting string into an intermediate correctable bit-string, e.g., using a mapper, and third apply a third randomization operation on the intermediate correctable bit-string, comprising, e.g., adding a random code word, apply a random permutation, introduce errors, etc, to obtain the first correctable bit-string. Using this organization either the first transformation or the third transformation is optional. Preferably, the third randomization preserves the correctable nature of the intermediate correctable bit-string. For example, an error correcting code and third transformation may be chosen such that the error correcting code is invariant under the third transformation. An error correcting code is invariant under a transformation, if the transformation maps code words to code words.

One advantageous way of randomization is the following. An error correcting code is chosen which is invariant under a class of permutations. The normalizer maps to the intermediate correctable string using any suitable method, e.g., adding a helper data bit-string, or applying a selection datastructure to the initial bit-string. The randomizing component comprises a random permutation selected form the permutation class and is applied to the intermediate correctable bit-string to obtain the first correctable bit-string. After error correction, the inverse of the random permutation is applied to the first code word. For example, the error correcting code is chosen as a so-called cyclic code, such as a BCH code and the permutation class comprises cyclic permutations.

Many error correcting codes may be used to construct helper data, for example, BCH codes, Reed-Muller codes, Golay codes, Reed-Solomon codes, LDPC codes, etc. It is noted that an error corrector 140 could be made which comprises only a single corrector using a block length which is equal or greater than the number of bits in the first correctable bit-string. However, it is also possible to use multiple levels of coding, e.g., by combining or concatenating different codes. On way of combining multiple codes to advantage is used in the architecture which is illustrated in FIG. 4.

Preferably, the operation time of the error corrector for establishing the first code word in dependency on the first correctable bit-string 330 is substantially independent from the first correctable bit-string. This may be accomplished with various means. For example, the error corrector may comprise a time-compensator. The time-compensator executes a random number of operations, such as waiting operations, or preferably dummy operations, which together take a random amount of time. The total amount of time taken by the error correcting can in this way be obscured and made substantially independent from the input, i.e., the first correctable bits string. Preferably, the error corrector is arranged for operating in substantially constant time. For example, the time-compensator could measure the amount of time elapsed during the establishment of the first code word, subtract this time from a per-determined maximum time, and then fill an amount of time equal to the remainder with wait and/or dummy operations.

It is also possible to achieve this effect by using an error correcting algorithm associated with an error correcting code, which has a constant execution time. An example of such an error correcting algorithm is an algorithm that enumerates all the code words in the error correcting code and selects a code word which is closest to the first correctable bit-string. Multiple of these codes may be concatenated. It is noted that some leakage reduction is achieved by reducing the dependency of the time consumption of the error corrector with its input.

Figure 4:
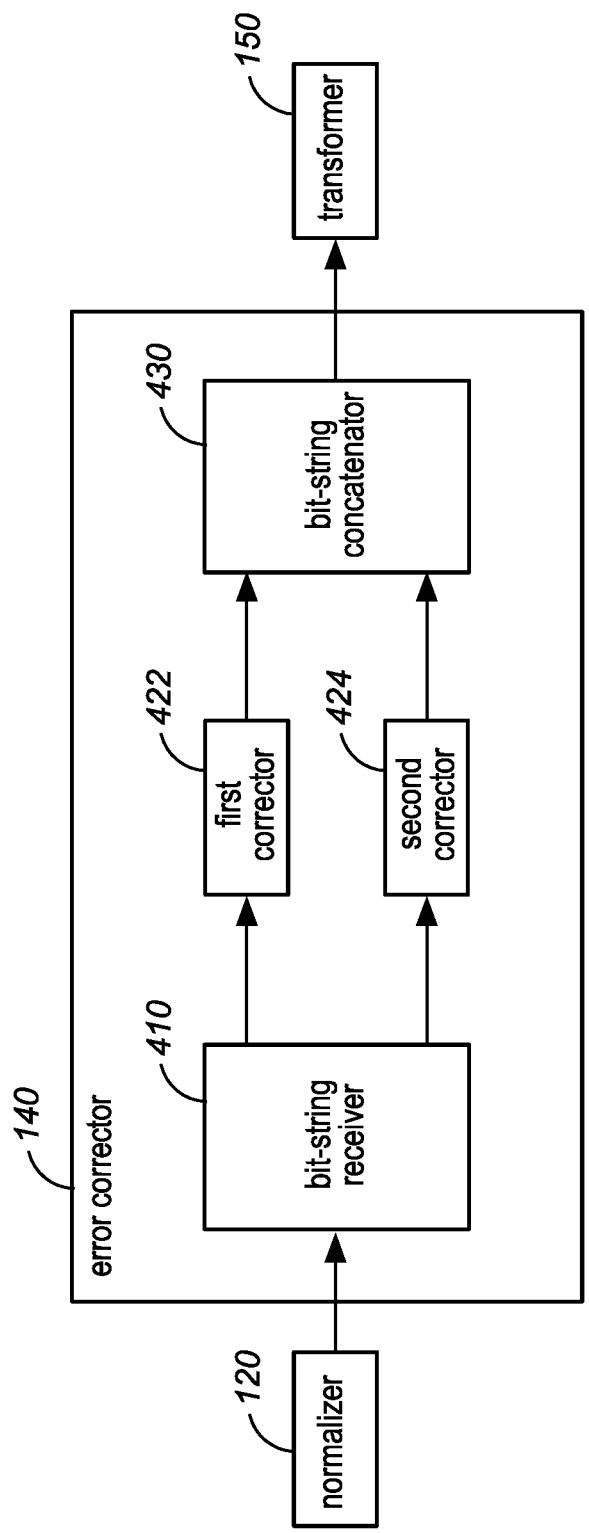
FIG. 4 is block diagram, schematically illustrating an architecture of an embodiment of the error corrector.

FIG. 4 illustrates a preferred embodiment of the error corrector 140, wherein error corrector 140 comprises a bit-string receiver 410, multiple correctors and a bit-string concatenator 430. Of the multiple correctors, two are shown: first corrector 422 and second corrector 424

Bit-string receiver 410 is connected to an input of error corrector 140 to receive the first correctable bit-string. The bit-string receiver 410 is arranged to split the first correctable bit-string 330 into multiple sub-strings. Each sub-string lies in the correctable neighborhood of some further error correcting code. For example, bit-string receiver 410 may split at pre-determined fixed boundaries. Each one of the multiple correctable sub-strings is passed to one of the multiple correctors, possibly in parallel. Note that error corrector 140 could comprise only one further corrector and use it serially, multiple times.

A corrector of the multiple correctors, preferably each one of them, performs error correcting in constant time. For example, first corrector 422 receives a further correctable bit-string and is arranged to use a further error correcting algorithm. The further error correcting algorithm may be arranged, to compare the further correctable bit-string to each code word in the further error correcting code to which the further error correcting algorithm is associated. When a further code word is found with a distance to the further correctable bit-string which is less than the correctable distance then that further code word may be forwarded to bit-string concatenator 430. Preferably, after finding the further code word, first corrector 422 continues to compare the further correctable bit-string to each further code word, to ensure that the amount of processing time is constant, regardless whether the further code word is found early or late. If first corrector 422 fails, i.e., if it does not find a further code word, it may signal this to bit-string concatenator 430, it may also forward a wrong bit-string, e.g., a random bit-string, or the all zero bit-string, etc.

Although the number of code words in an error correcting code word is typically large, by using a concatenated code which may be distributed over multiple correctors the time to enumerate all code words in the further error correcting codes is reduced to manageable proportions. A concatenated code can also be decoded by a single error corrector which is applied to the sub-strings sequentially.

Preferably, bit-string receiver 410 comprises an interleaver for interleaving the bits in the first correctable bit-string 330 such that bursts of error bits are distributed over the multiple correctors.

Bit-string concatenator 430 receives from each one of the multiple correctors a further code word and combines them to create the first code word.

Preferably, bit-string concatenator 430 comprises a concatenator for concatenating the multiple further code words. Preferably, bit-string concatenator 430 comprises a large error corrector for error correcting said concatenated bit-string using a large error correcting code and algorithm. As it may happen in practice that one of the multiple correctors fails and does not forward bit-string, or forwards a wrong one, the large error corrector can compensate for this using the large error corrector. Preferably, the large error corrector has a large block-size, that is, a block size equal to or larger than the block size of the first code word, and a high rate. Since the multiple correctors will correct most, if not all, of the errors, the large error correcting code need only have a low correctable distance.

Additionally, using multiple small error correctors may give a more efficient decoding than one monolithic error correcting code, albeit this gain in efficiency may be compensated by a reduction of the rate of the combined code.

Figure 5B:
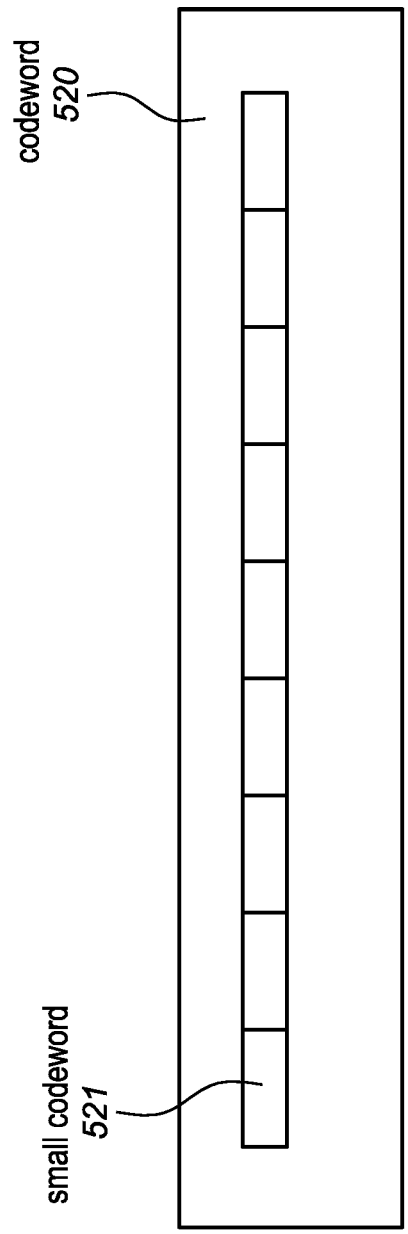

For example, an error correcting code may be constructed by concatenating a number of smaller codes. For example, code words of length 135 bits may be constructed by concatenating 9 smaller codewords, taken from a BCH (15, 5, 7) error correcting code. FIG. 5b is a schematic illustration of a codeword obtained by concatenation. FIG. 5b shows a code word 520, which is made up of a number of smaller code words. Each code word was taken, preferably independently from each other, from a smaller error correcting code. There are shown 9 of these smaller code words, one of which is labeled with reference number 521.

Decoding a correctable bit-string to a code word from a concatenated error correcting code may be done in various ways. For example, the first correctable bit string may be partitioned into a plurality of sub-strings. This partitioning may be done at fixed boundaries, e.g., after each 15 bit. However, the partitioning may be more involved. For example, an interleaving permutation may first be applied. Or the sub-strings may be obtained by applying a plurality of sub-string producing functions, preferably linear functions, on the first correctable bit-string. A smaller error corrector, which may be comprised in error corrector 140, e.g., first error corrector 422 may be applied sequentially, to each one of the substring to produce a plurality smaller code words, which are then concatenated. If multiple error correctors are available they may be operated on the plurality of sub-strings in parallel. For example, nine smaller code words may be error corrected in 5 batches, if two error correctors, e.g., first and second error corrector 422 and 424 are available.

Preferably, a correctable string, such as a correctable substring, is decoded using an enumeration of all the code words in the error correcting code. For example, a code word producer may sequentially produce all the code words in the error correcting code. For each produced code word a distance is determined between the produced code word and the correctable bit-string. Preferably a distance measure is used which is associated with the error correcting code. Preferably the distance measure is a hamming distance. The closest code word so obtained may be used in an output of the error corrector. Alternatively, a look up table enumerating all the code words may be used. A look-up table saves the expenditure of producing the code words each time a decoding is needed. Alternatively, a look-up table enumerating all correctable bit-strings, including all code words, which maps a correctable bit-string to the corresponding code word is used. Possibly, the look-up table also includes uncorrectable bit-strings. An uncorrectable bit-string may be mapped to a special bit-string indicating error, e.g., a correcting failure. Alternatively, an uncorrectable bit-string is mapped to a most likely code word, e.g., an arbitrary one of the code words being closest to the uncorrectable bit-string.

By enumerating all code words in the error correcting code it is ensured that the running time of the error correcting code is constant, and independent from the input.

If a concatenated code is used, then preferably, a constant time algorithm, such as one described above, is used for each sub-string. However, constant time algorithm may also be employed for fewer, or even one of the smaller code words. When this is employed the running time of the error corrector is somewhat masked, and leakage through the time side channel is correspondingly somewhat reduced.

Depending on the error rate, the concatenated error correcting code may be used as an alternative error correcting code. For example, the error correcting code comprising 9 smaller code words taken from BCH (15, 5, 7) may sometimes be used to replace a BCH (127, 15, 55) code. First of all, such code words are longer than 127 bits. The additional 8 may be set to zero, let random, or set to any other convenient value. Moreover, a BCH (127, 15, 55) can correct up to 27 errors, that is, about 20% of the 127 bits. A BCH (15, 5, 7) code word can correct 3 errors, which is also 20% of the 15 bits. Hence the concatenated code is of comparable length and of comparable error correcting strength. Although using the long code word may have the advantage of being more robust against burst errors, the concatenated code may be made more resilient against burst error by the use of interleaving permutations.

In FIG. 5b, the 9 smaller code words are each sequentially stored. However, in an alternative embodiment the bits are stored in a permuted order, e.g., to reduce burst errors. For example, before the error correcting takes place a permutation may be performed to collect bits corresponding to a smaller code word. For example, an interleaving permutation could be performed, using an interleaver.

In a embodiment, the code words in of the error correcting code or of a further error correcting code such as may be used by a further error corrector, such as correctors 422 and/or 424 may be stored in a look-up table, e.g., in a storage (not shown).

Some choices of the error correcting code allow a reduction in the storage size. Part of the error correcting code may be a simple sequence which may be produced easily. In particular if the error correcting code comprises a sequential list of integers in data parts of the code words, then a substantial saving may be realized by omitting storage of this part.

As an example, the table below lists a small error correcting code. It is a hamming code with a block size of 7 and a dimension of 4. It has $2^4=16$ code words.

| Code Word | Data Part | Redundancy Part |
|---|---|---|
| 0000 000 | 0000 | 000 |
| 0001 111 | 0001 | 111 |
| 0010 110 | 0010 | 110 |
| 0011 001 | 0011 | 001 |
| 0100 101 | 0100 | 101 |
| 0101 010 | 0101 | 010 |
| 0110 011 | 0110 | 011 |
| 0111 100 | 0111 | 100 |
| 1000 011 | 1000 | 011 |
| 1001 100 | 1001 | 100 |
| 1010 101 | 1010 | 101 |
| 1011 010 | 1011 | 010 |
| 1100 110 | 1100 | 110 |
| 1101 001 | 1101 | 001 |
| 1110 000 | 1110 | 000 |
| 1111 111 | 1111 | 111 |

The codewords are listed in the first column. In an implementation this column could be stored in a storage. If a bit string must be decoded, each code word in the list is compared to the bit string the find a code word which is closest to the bit string.

As can be seen, the code words have been ordered such that a data part, which is in this case formed by the first four bits, and indicated in the second column, form a sequential list. In this case the integers 0 to 15 in binary form. The remaining bits are given in the third column. The error correcting properties arise out of the combination of a data part and a corresponding redundancy part.

By only storing the third column a saving of 3/7-th is achieved, that is about 43%. A codeword can be reconstructed by concatenating the index in the table with the corresponding redundancy part. To decode a bit string, its first four bits are compared with a table index and its last three bits are compared with the table entry found at the table index.

In a preferred embodiment, the key derivation algorithm further depends on an index, the cryptographic system comprising an index establisher. The index establisher may for example comprise a random number generator for generating the index. When the cryptographic key is used for communications with some other party then cryptographic system 100 is arranged to communicate the index to the other party. If the other party has a copy of the enrollment bit-string or of the second code word, the other party can use the index to derive the cryptographic key using the same steps as cryptographic system 100 used. Preferably, the other party does not use a randomizing component in its normalizer, although this is possible.

In a preferred embodiment, the key derivation algorithm comprises selecting a hash function from a family of hash functions in dependence upon the index. The key establisher is configured for applying said selected hash function to the first code word. Removing the effect of the randomizing component is dependent on the selected hash function applied to the randomizing component.

To improve the cryptographic properties of a system according to this embodiment, preferably, the family of hash functions and a selection function for selecting a hash function from the family of hash functions in dependence upon an index is a universal hash function.

Not all families of hash functions are compatible with the requirement that the effect of the randomizing component can be removed after the hashing has been performed. However, one may chose a family of hash functions which is homomorphic with respect to the establishing of the first correctable bit-string in dependence on the randomizing component. The homomorphism allows the random component to be removed after the hashing. By applying the selected hash function to the random component a hashed randomized component is obtained which may be removed in the inverse manner in which the randomizing component was applied.

It was an insight of the inventor to combine the key derivation with a family of hash functions. Since the choice of hash function is randomized through the index, the individual cryptographic requirements of a hash function in the family can be lessened, at least for less sensitive applications. In particular, this allows a sufficient cryptographic strength while postponing the removal of the randomizing component.

For example, for the key derivation function (also known as a compression function) a universal hash function with an index may be chosen which has linearity properties. This allows the randomization procedure to be taken one step further. The randomizing component need only be removed at the end of the computation, after the universal hash computation by compensating the output of the hash appropriately. This improves the resistance of the embodiment against side channel attacks.

As an example, for the family of hash functions, a so-called polynomial hash could be used. The polynomial hash is an example of a universal hash function.

The polynomial hash is defined as follows: A message m, in our case the first code word, is portioned into parts of length n bits, the final part may be padded if necessary. That is $m=m1\|m2\|\ldots\|ml$. The hash function corresponding to index k is defined as $G\_k(m)=\text{Sigma}\ (mi.k^i)$ herein the computation is done over the field $GF(2^n)$. Note that these functions are linear with respect to addition in $GF(2^n)$. The block length is predetermined and fixed, and chosen to allow efficient computation, for example n=32 is an appropriate choice for some applications.

If a mask, e.g. a random code word, is added to the message, and thereby to the message blocks, this will go right through the formula and can be removed by computing the hash of the mask.

Other GF-linear (xor-linear) examples are Toeplitz Hashing, bucket hashing.

Other examples may be used with arithmetic masking, e.g. addition mod p or mod $2^{32}$, $2^{64}$, etc. These include for example to so-called hashes: MMH, NH, NMH etc. For some hash functions, in particular in this category, it may be needed to mask only parts of the message so that the randomizing component may be removed after the hash function is applied.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and "include" and its conjugations do not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. A computer program product may be stored and/or distributed on a suitable medium, such as optical storage, but may also be distributed in other forms, such as being distributed via the Internet or wired or wireless telecommunication systems. In a system/device/apparatus claim enumerating several means, several of these means may be embodied by one and the same item of hardware. The mere fact that certain measures are recited in mutually different dependent claims does not indicate that a combination of these measures cannot be used to advantage.

The invention claimed is:

1. A cryptographic system for reproducibly establishing a cryptographic key comprising:
    a physical system comprising a physical, at least partially random, configuration of components,
    an initial bit-string producer circuit to establish an initial bit-string, the initial bit-string depending on the configuration,
    a randomizer circuit to produce a randomizing component, the randomizer circuit being configured to produce a random code word of an error correcting code, the randomizing component comprising the random code word,
    a normalizer circuit to establish in dependency on the initial-bit string a first correctable bit-string, the first correctable bit-string lying in a correctable neighborhood of the error correcting code, a pre-determined error correcting algorithm for mapping an element of the correctable neighborhood to a code word being associated with the error correcting code, the establishing of the first correctable bit-string being randomized by being dependent on the randomizing component, an error-corrector circuit to establish a first code word of an error correcting code in dependency on the first correctable bit-string using the error correcting algorithm, the error-corrector circuit operating on randomized data a key establisher circuit to establish the cryptographic key from the first code word and the randomizing component by applying a pre-determined key derivation algorithm, the establishing of the cryptographic key being dependent on the randomizing component for making the cryptographic key reproducible by removing the effect of the randomizing component after the error-corrector circuit established the first code word, a code word adder circuit and a code word subtractor circuit, wherein the normalizer circuit is coupled to the code word adder circuit to add at least the random code word to at least the initial bit-string, and the key establisher circuit is coupled to the code word subtractor circuit to subtract the random code word from the first code word.

2. The cryptographic system as in claim 1 comprising a helper data store for storing a helper data bit-string, the helper data bit-string being a difference between an enrollment bit-string established by the initial bit-string producer circuit and a second code word of the error correcting code, the code word adder circuit being configured for adding at least the helper data bit-string, the initial bit-string and the random code word to establish the first correctable bit-string.

3. The cryptographic system as in claim 2, wherein the code word adder circuit is configured for first adding the helper data bit-string and the random code word to obtain an intermediate bit-string and for adding the initial bit-string to the intermediate bit-string, or for first adding the random code word and the initial bit-string to obtain the intermediate bit-string and for adding the helper data bit-string to the intermediate bit-string.

4. The cryptographic system as in claim 1, wherein the randomizing component comprises a random permutation from a permutation class, the error correcting code being invariant under the permutation class, the normalizer circuit being configured for establishing in dependency on the initial-bit string an intermediate correctable bit-string lying in the correctable neighborhood, the normalizer circuit being configured for permuting according to the random permutation the intermediate correctable bit-string to establish the first correctable bit-string, the key establisher circuit being configured for permuting the first code word according to an inverse of the random permutation.

5. The cryptographic system as in claim 1, wherein the permutation class consists of cyclic permutations and the error correcting code is a cyclic code.

6. The cryptographic system as in claim 1, wherein an execution time of the error-corrector circuit to establish the first code word in dependency on the first correctable bit-string is independent from the first correctable bit-string.

7. The cryptographic system as in claim 1, wherein the randomizer circuit comprises
a random number generator configured to generate a random number, and
an encoder associated with the error correcting code, and configured to take the random number as input and to produce the random code word of the error correcting code as output.

8. The cryptographic system as in claim 1, further comprising a non-transitory computer readable medium on which is embodied software and a microprocessor arranged to execute the software, the microprocessor executing the software implementing: the randomizer circuit, the normalizer circuit, the error-corrector circuit, and the key establisher circuit.

9. A cryptographic system for reproducibly establishing a cryptographic key comprising:
a physical system comprising a physical, at least partially random, configuration of components,
an initial bit-string producer circuit to establish an initial bit-string, the initial bit-string depending on the configuration,
a normalizer circuit to establish in dependency on the initial-bit string a first correctable bit-string, the first correctable bit-string lying in a correctable neighborhood of an error correcting code, a pre-determined error correcting algorithm for mapping an element of the correctable neighborhood to a code word being associated with the error correcting code,
an error-corrector circuit to establish a first code word of an error correcting code in dependency on the first correctable bit-string using the error correcting algorithm,
a key establisher circuit to establish the cryptographic key from the first code word by applying a pre-determined key derivation algorithm, wherein the error-corrector circuit is arranged to:
partition the first correctable bit-string into a plurality of sub-strings, a specific sub-string of the plurality of sub-strings lying in a further correctable neighborhood of a further error correcting code, and
select a specific further code word within a pre-determined time from an enumeration of all further code words in the further error correcting code, the specific further code word being closest to the specific sub-string, according to a predetermined distance function,
wherein establishing the first code word is further dependent on the specific further code word.

10. The cryptographic system as in claim 9, wherein each code word in the further error correcting code comprises a data part and a redundancy part, the error correcting code having an ordering according to which a collection of the data parts of the code words in the further error correcting code form a sequential list of integers, the system comprises a storage for storing the redundancy parts of the code words according to the ordering.

11. The cryptographic system as in claim 1, wherein the key derivation algorithm further depends on an index, the cryptographic system comprising an index establisher for establishing the index.

12. The cryptographic system as in claim 11 wherein
the key derivation algorithm comprises selecting a hash function from a family of hash functions in dependence upon the index,
the key establisher circuit being configured for applying said selected hash function to the first code word
removing the effect of the randomizing component being dependent on the selected hash function applied to the randomizing component.

13. The cryptographic system as in claim 9 comprising:
a randomizer circuit to produce a randomizing component, wherein
the normalizer circuit is configured so that the establishing of the first correctable bit-string is randomized by being dependent on the randomizing component,
the error-corrector circuit operates on randomized data,
the key establisher circuit is configured for establishing the cryptographic key from the first code word and the randomizing component by applying a pre-determined key derivation algorithm, the establishing of the cryptographic key being dependent on the randomizing component for making the cryptographic key reproducible by removing the effect of the randomizing component after the error-corrector circuit established the first code word.

14. A cryptographic system for reproducibly establishing a reproducible code word comprising:
- a physical system comprising a physical, at least partially random, configuration of components,
- an initial bit-string producer circuit to establish an initial bit-string, the initial bit-string depending on the configuration,
- a randomizer circuit to produce a randomizing component, the randomizer circuit being configured to produce a random code word of an error correcting code, the randomizing component comprising the random code word,
- a normalizer circuit to establish in dependency on the initial-bit string a first correctable bit-string, the first correctable bit-string lying in a correctable neighborhood of the error correcting code, a pre-determined error correcting algorithm for mapping an element of the correctable neighborhood to a code word being associated with the error correcting code, the establishing of the first correctable bit-string being randomized by being dependent on the randomizing component,
- an error-corrector circuit to establish a first code word of an error correcting code in dependency on the first correctable bit-string using the error correcting algorithm, the error-corrector circuit operating on randomized data, and
- a transformer circuit to transform the first code word with the randomizing component into the reproducible code word, the transforming being dependent on the randomizing component for making the reproducible code word reproducible by removing the effect of the randomizing component after the error-corrector circuit established the first code word,
- a code word adder circuit and a code word subtractor circuit, wherein the normalizer circuit is coupled to the code word adder circuit to add at least the random code word to at least the initial bit-string, and the key establisher circuit is coupled to the code word subtractor circuit to subtract the random code word from the first code word.

15. A cryptographic method for reproducibly establishing a cryptographic key comprising:
- establishing an initial bit-string, the initial bit-string depending on a physical, at least partially random, configuration of components comprised in a physical system,
- producing a randomizing component, producing a random code word of an error correcting code, the randomizing component comprising the random code word,
- establishing in dependency on the initial-bit string a first correctable bit-string, the first correctable bit-string lying in a correctable neighborhood of the error correcting code, a pre-determined error correcting algorithm for mapping an element of the correctable neighborhood to a code word being associated with the error correcting code, establishing of the first correctable bit-string being randomized by being dependent on the randomizing component, adding at least the random code word to at least the initial bit-string,
- establishing a first code word of an error correcting code in dependence on the first correctable bit-string using the error correcting algorithm, the error correcting algorithm operating on randomized data,
- establishing the cryptographic key from the first code word and the randomizing component by applying a pre-determined key derivation algorithm, the establishing of the cryptographic key being dependent on the randomizing component for making the cryptographic key reproducible by removing the effect of the randomizing component after the establishing of the first code word, subtracting the random code word from the first code word.

16. A cryptographic method for reproducibly establishing a cryptographic key comprising:
- establishing an initial bit-string, the initial bit-string depending on a physical, at least partially random, configuration of components comprised in a physical system,
- producing a randomizing component,
- establishing in dependency on the initial-bit string a first correctable bit-string, the first correctable bit-string lying in a correctable neighborhood of an error correcting code, a pre-determined error correcting algorithm for mapping an element of the correctable neighborhood to a code word being associated with the error correcting code, establishing of the first correctable bit-string being randomized by being dependent on the randomizing component,
- establishing a first code word of an error correcting code in dependence on the first correctable bit-string using the error correcting algorithm, the error correcting algorithm operating on randomized data,
- establishing the cryptographic key from the first code word by applying a pre-determined key derivation algorithm,
- partitioning the first correctable bit-string into a plurality of sub-strings, a specific sub-string of the plurality of sub-strings lying in a further correctable neighborhood of a further error correcting code and
- selecting a specific further code word within a pre-determined time from an enumeration of all further code words in the further error correcting code, specific further code word being closest to the specific sub-string, according to a predetermined distance function, and
- wherein establishing the first code word is further dependent on the specific further code word.

17. The cryptographic method as in claim 16, comprising:
producing a randomizing component,
wherein
- the establishing of the first correctable bit-string is randomized by being dependent on the randomizing component,
- the error correcting algorithm operates on randomized data,
- the cryptographic key is established from the first code word and the randomizing component by applying a pre-determined key derivation algorithm, the establishing of the cryptographic key being dependent on the randomizing component for making the cryptographic key reproducible by removing the effect of the randomizing component after the establishing of the first code word.

18. The cryptographic method as in claim 15, comprising establishing an index, and wherein establishing the cryptographic key further depends on the index.

19. A non-transitory computer readable medium on which is embodied a computer program for reproducibly establishing a cryptographic key, the computer program being adapted for execution on a computer having access to a physical system comprising a physical, at least partially random, configuration of components, the computer program comprising:

computer program code adapted to establish an initial bit-string, the initial bit-string depending on the physical, at least partially random, configuration of components comprised in the physical system, computer program code adapted to produce a randomizing component and being configured to produce a random code word of an error correcting code, the randomizing component comprising the random code word, computer program code adapted to establish in dependency on the initial-bit string a first correctable bit-string, the first correctable bit-string lying in a correctable neighborhood of the error correcting code, a pre-determined error correcting algorithm for mapping an element of the correctable neighborhood to a code word being associated with the error correcting code, establishing of the first correctable bit-string being randomized by being dependent on the randomizing component, adding at least the random code word to at least the initial bit-string, computer program code adapted to establish a first code word of an error correcting code in dependence on the first correctable bit-string using the error correcting algorithm, the error correcting algorithm operating on randomized data, computer program code adapted to establish the cryptographic key from the first code word and the randomizing component by applying a pre-determined key derivation algorithm, the establishing of the cryptographic key being dependent on the randomizing component for making the cryptographic key reproducible by removing the effect of the randomizing component after the establishing of the first code word, subtracting the random code word from the first code word.

* * * * *